United States Patent
Lin et al.

(10) Patent No.: US 9,503,751 B2
(45) Date of Patent: Nov. 22, 2016

(54) METHOD AND APPARATUS FOR SIMPLIFIED DEPTH CODING WITH EXTENDED PREDICTION MODES

(71) Applicant: MEDIATEK INC., Hsin-Chu (TW)

(72) Inventors: Jian-Liang Lin, Yilan (TW); Yi-Wen Chen, Taichung (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 255 days.

(21) Appl. No.: 14/480,788

(22) Filed: Sep. 9, 2014

(65) Prior Publication Data

US 2015/0110170 A1    Apr. 23, 2015

Related U.S. Application Data

(60) Provisional application No. 61/892,240, filed on Oct. 17, 2013.

(51) Int. Cl.
| | |
|---|---|
| *H04N 11/02* | (2006.01) |
| *H04N 19/597* | (2014.01) |
| *H04N 19/11* | (2014.01) |
| *H04N 19/593* | (2014.01) |

(52) U.S. Cl.
CPC ...... *H04N 19/597* (2014.11); *H04N 19/00042* (2013.01); *H04N 19/593* (2014.11)

(58) Field of Classification Search
USPC ........................................ 375/240.01–240.29
See application file for complete search history.

(56) References Cited

U.S. PATENT DOCUMENTS

2014/0294061 A1* 10/2014 Zhang .............. H04N 19/00042
375/240.02

OTHER PUBLICATIONS

Jager, F.; "3D-CE6.h Simplified Depth Coding with an optional Depth Lookup Table" Joint Collaborative Team on 3D Video Coding Extension Development of ITU-T SG WP 3 and ISO/IEC JTC 1/SC 29/WG 11; Oct. 2012; pp. 1-17.
Jo, H., et al.; "CE6 Simplified DC calculation for SDC;" Joint Collaborative Team on 3D Video Coding Extensions of ITU-T SG WP 3 and ISO/IEC JTC 1/SC 29/WG 11; Jul.-Aug. 2013; pp. 1-7.

* cited by examiner

*Primary Examiner* — Leron Beck
(74) *Attorney, Agent, or Firm* — McClure, Qualey & Rodack, LLP

(57) ABSTRACT

A method and apparatus for Simplified Depth Coding (SDC) with extended Intra prediction modes are disclosed. Embodiments of the present invention use an extended Intra prediction mode set including Horizontal mode and Vertical mode. When the Horizontal mode is selected, the prediction samples for the current depth block are derived based on a reconstructed neighboring depth column adjacent to a left block boundary of the current depth block by generating rows of the prediction samples from the reconstructed neighboring depth column. When the Vertical mode is selected, the prediction samples for the current depth block are derived based on a reconstructed neighboring depth row adjacent to a top block boundary of the current depth block by generating columns of the prediction samples from the reconstructed neighboring depth row.

16 Claims, 6 Drawing Sheets

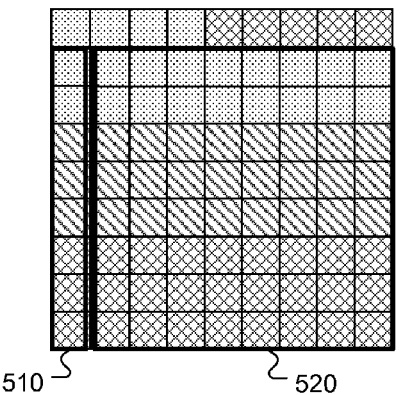 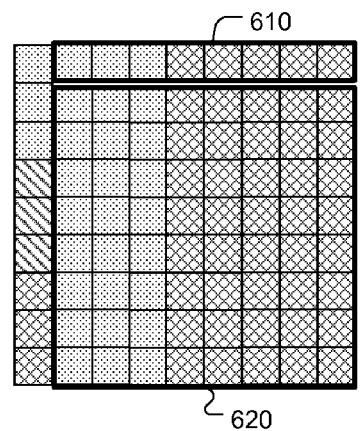
Fig. 5  Fig. 6
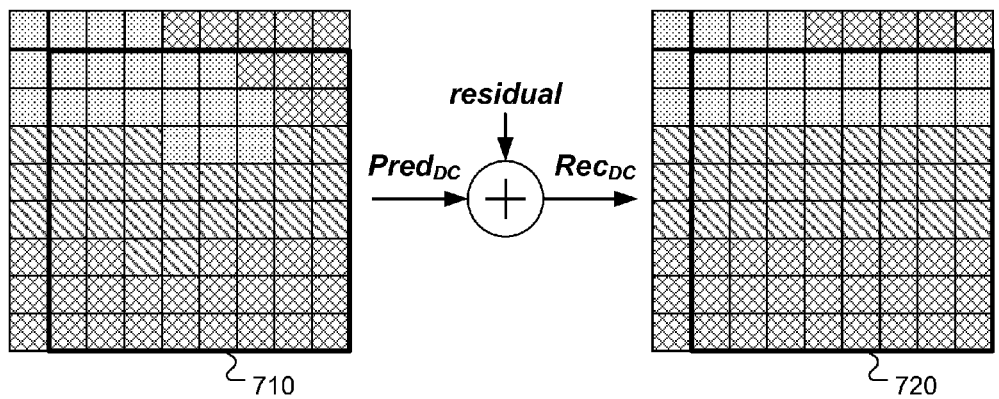
Fig. 7

METHOD AND APPARATUS FOR SIMPLIFIED DEPTH CODING WITH EXTENDED PREDICTION MODES

CROSS REFERENCE TO RELATED APPLICATIONS

The present invention claims priority to U.S. Provisional Patent Application Ser. No. 61/892,240, filed on Oct. 17, 2013, entitled "Methods of Intra Coding Improvement". The U.S. Provisional Patent Application is hereby incorporated by reference in its entirety.

FIELD OF THE INVENTION

The present invention relates to three-dimensional and multi-view video coding. In particular, the present invention relates to depth coding using Simplified Depth Coding (SDC) with Extended Prediction Modes.

BACKGROUND AND RELATED ART

Three-dimensional (3D) television has been a technology trend in recent years that is targeted to bring viewers sensational viewing experience. Multi-view video is a technique to capture and render 3D video. The multi-view video is typically created by capturing a scene using multiple cameras simultaneously, where the multiple cameras are properly located so that each camera captures the scene from one viewpoint. The multi-view video with a large number of video sequences associated with the views represents a massive amount data. Accordingly, the multi-view video will require a large storage space to store and/or a high bandwidth to transmit. Therefore, multi-view video coding techniques have been developed in the field to reduce the required storage space and the transmission bandwidth. In three-dimensional and multi-view coding systems, the texture data as well as depth data are coded.

For depth map, the Simplified Depth Coding (SDC), which is also termed as Segment-wise DC Coding, is an alternative Intra coding mode. Whether SDC is used is signalled by a SDC flag at coding unit (CU) level. For SDC, the depth block is Intra predicted by a conventional Intra mode or depth modelling mode 1. The partition size of SDC-coded CU is always 2N×2N and therefore there is no need for signaling in the bitstream regarding the block size of SDC-coded CU. Furthermore, instead of coded as quantized transform coefficients, the SDC-coded residuals are represented by one or two constant residual values depending on whether the depth block is divided into one or two segments.

According to existing three-dimensional video coding based on HEVC (3D-HEVC), certain information is signalled for SDC-coded blocks. The information signalled includes:
1. type of segmentation/prediction of the current block. Possible values are
   i. DMM (Depth Modelling Mode) Mode 1—Explicit Wedgelets (2 segments)
   ii. Planar (1 segment)
2. For the DMM, additional prediction information (e.g., partition information) is coded.
3. For each resulting segment, a residual value (in the pixel domain) is signalled in the bitstream In the depth coding process, the depth samples are first mapped to limited depth values. The limited depth values are represented by a Depth Lookup Table (DLT), and after mapping depth samples into limited depth values, these limited depth values are used as the indexes pointing to entries of the DLT. Consequently, residuals can be generated by taking the difference between the DLT index of the predictor and the original depth samples; the index residual can then be coded and sent to the decoder. The depth values present in a depth map are usually limited to a number smaller than the total number that can be represented by a depth capture device. Therefore, the use of DLT can reduces the bit depth required for residual magnitudes. This mapping table is transmitted to the decoder so that the inverse lookup from an index to a valid depth value can be performed at the decoder.

At the encoder side, the residual index $i_{resi}$ to be coded into the bitstream, is determined according to:

$$i_{resi} = I(d_{orig}) - I(d_{pred}), \quad (1)$$

where $d_{orig}$ denotes an original depth value determined for the depth block (e.g., the mean value of the original depth block), $d_{pred}$ denotes the predicting depth value (e.g., the mean value of the prediction samples for the depth block), and I(.) denotes the Index Lookup Table. The computed residual index $i_{resi}$ is then coded with a significance flag, a sign flag and with $\lceil \log_2 d_{valid} \rceil$ bits for the magnitude of the residual index, where $d_{valid}$ denotes the number of valid depth values and $\lceil x \rceil$ is a ceiling function corresponding to the smallest integer not less than x.

The Depth Lookup Table takes advantage of the sparse property of the depth map, where only a small number of depth values out of a full available depth range (e.g., $2^8$) will typically be present in the depth map. In the encoder, a dynamic depth lookup-table is constructed by analyzing a number of frames (e.g. one Intra period) of the input sequence. This depth lookup-table is used during the coding process to reduce the effective signal bit-depth of the residual signal.

In order to reconstruct the lookup table, the encoder reads a pre-defined number of frames from the input video sequence to be coded and scans all samples for presence of the depth values. During this process a mapping table is generated that maps depth values to existing depth values based on the original uncompressed depth map.

The Depth Lookup Table D(.), the index Lookup Table I(.), the Depth Mapping Table M(.) and the number of valid depth values $d_{valid}$ are derived by the following process that analyses the depth map $D_t$:
1. Initialization
   boolean vector B(d)=FALSE for all depth values d, index counter i=0.
2. Process each pixel position p in $D_t$ for multiple time instances t:
   Set B($D_t$(p))=TRUE to mark valid depth values.
3. Count the number of TRUE values in B(d). The result is set to the value for $d_{valid}$.
4. For each d with B(d)==TRUE:
   Set D(i)=d,
   Set M(d)=d,
   Set I(d)=i, and
   i=i+1.
5. For each d with B(d)==FALSE:
   Find $\hat{d}$=arg min|d−$\hat{d}$| and B($\hat{d}$)==TRUE
   Set M(d)=$\hat{d}$.
6. Set I(d)=I($\hat{d}$).

As mentioned above, there are two types of segmentation and prediction in the existing SDC. The respective processes for the two types of segmentation and prediction are described as follows.

DMM Mode:
  Edge information is defined by start/end side and corresponding index.
  The DC prediction value (i.e., predicting depth value ($d_{pred}$)) for each segment are predicted by neighboring depth values (also referred as neighboring depth samples or neighboring samples in this disclosure) as shown in FIG. 1. Two examples of depth blocks (110 and 120) are shown in FIG. 1, where each depth block is divided into two segments as shown by the dashed line. The reconstructed neighboring depth samples used to generate prediction samples for block 110 are indicated by reference numbers 112 and 114, and the reconstructed neighboring depth samples used to generate prediction samples for block 120 are indicated by reference numbers 122 and 124 in FIG. 1.

Planar Mode:

Generate the predictors (i.e., prediction samples) of the Planar mode as shown in FIG. 2. Linear interpolation is used to generate predictors for the right column and the bottom row as shown in FIG. 2A. For the right column, the linear interpolation is based on depth values at A and Z. For the bottom row, the linear interpolation is based on depth values at B and Z. After the right column and the bottom row are interpolated, the predictors for the rest of depth positions are bilinear interpolated using four respective depth samples from four sides as shown in FIG. 2B.

The DC prediction value (i.e., a single predicting depth value ($d_{pred}$) for the block) is the mean of the predictors of the Planar mode.

In the above derivation processes, prediction sample refers to the predicted value generated by the Intra coding mode, which may be DMM Mode 1 or the Planar mode in the existing 3D-HEVC. The reconstruction process for the Planar mode at the decoder side is illustrated in FIG. 3. The DC prediction value ($Pred_{DC}$) for the current depth block (310) is determined based on the mean of the predicted depth samples for the current depth block. The predicted depth values for the current depth block are derived using linear interpolation (right column and bottom row) and bilinear interpolation (other depth samples) of neighboring reconstructed depth values. In FIG. 3, the predicted depth values are shown in the current depth block (310). To reconstruct the depth value ($Rec_{DC}$) for the current depth block, a DLT index is first obtained by adding residual index to the DLT index of $Pred_{DC}$. The reconstructed depth value ($Rec_{DC}$) for the current depth block is then obtained by applying inverse lookup on this derived index. The residual pixel value (pixel domain) is then obtained by taking difference of $Rec_{DC}$ and $Pred_{DC}$. The final reconstructed depth block (320) is derived by adding this residual pixel value to each prediction sample of the current block.

The reconstruction process for the DMM Mode 1 at the decoder side is illustrated in FIG. 4. The current depth block (410) is divided into two segments. The DC prediction values ($Pred_{DC1}$ and $Pred_{DC2}$) for the two segments of the current depth block (410) are determined based on respective neighboring reconstructed depth values. In FIG. 4, the predicted depth values are shown in the current depth block (410). To reconstructed depth values ($Rec_{DC1}$ and $Rec_{DC2}$) for the two segments of the current depth block, two DLT indexes are first obtained by adding corresponding residual index to the DLT index of $Pred_{DC1}$ and $Pred_{DC2}$. The reconstructed depth value ($Rec_{DC1}$ and $Rec_{DC2}$) for the current depth block is then obtained by applying inverse lookup on this derived index. The residual pixel value (pixel domain) is then obtained by taking difference of $Rec_{DC1}$ and $Pred_{DC1}$, and $Rec_{DC2}$ and $Pred_{DC2}$, respectively. The final reconstructed depth block (420) is derived by adding this residual pixel value to each prediction sample of each segment of the current block.

In the conventional SDC for depth block coding, only limited prediction modes are provided. It is desirable to extend the prediction modes to improve coding efficiency.

BRIEF SUMMARY OF THE INVENTION

A method and apparatus for Simplified Depth Coding or Segment-wise DC Coding (SDC) with extended Intra prediction modes are disclosed. Embodiments of the present invention use an extended Intra prediction mode set comprising Horizontal mode and Vertical mode. When the Horizontal mode is selected, the prediction samples for the current depth block are derived based on a reconstructed neighboring depth column adjacent to a left block boundary of the current depth block by generating rows of the prediction samples from the reconstructed neighboring depth column. When the Vertical mode is selected, the prediction samples for the current depth block are derived based on a reconstructed neighboring depth row adjacent to a top block boundary of the current depth block by generating columns of the prediction samples from the reconstructed neighboring depth row. The extended mode set may also include other Intra prediction modes such as Planar mode and DMM (Depth Modelling Mode) mode. The Intra prediction modes in the mode set can be coded using a truncated unary code.

According to SDC, each depth block may have one segment or two segments. For each segment, a predicting depth value is determined, where the predicting depth value corresponds to the mean of the prediction samples for the segment according to the conventional SDC. One aspect of the present invention addresses the derivation of the predicting value by other means. In one group of embodiments, the predicting depth value is derived based on partial prediction samples, sub-sampled prediction samples or a subset of the prediction samples. For example, when the Horizontal mode is used, the predicting depth value block can be determined based on two corner prediction samples of a left-most column of the current depth block. When the Vertical mode is selected, the predicting depth value can be determined based on two corner prediction samples of a top row of the current depth block. Furthermore, the predicting depth value can be determined based on the mean, median, maximum, minimum, or linear combination of the partial prediction samples, sub-sampled prediction samples or a subset of the prediction samples.

In another group of embodiments, the predicting depth value is derived based on all or partial reconstructed neighboring depth samples. For example, if the Horizontal mode is selected, the predicting depth value is determined based on all reconstructed samples, one reconstructed samples, partial reconstructed samples, two corner reconstructed samples, or four corner reconstructed samples of the reconstructed neighboring depth column adjacent to the left block boundary of the current depth block. If the Vertical mode is selected, the predicting depth value is determined based on all reconstructed samples, one reconstructed samples, partial reconstructed samples, two corner reconstructed samples, or four corner reconstructed samples of the reconstructed neighboring depth row adjacent to the top block boundary of the current depth block.

In one embodiment, when a subset of the prediction samples is used to derive the predicting depth value, two different modes may use two different subsets. For example, if the Horizontal mode and another mode are used, the predicting depth value may be derived based a subset corresponding to one prediction sample, two corner prediction samples or all prediction samples located in a selected column of the current depth block for the Horizontal mode while another subset is used for another mode. If the vertical mode and another mode are used, the predicting depth value may be derived based one prediction sample, two corner prediction samples or all prediction samples located in a selected row of the current depth block for the Vertical mode while another subset is used for another mode.

BRIEF DESCRIPTION OF THE DRAWINGS

FIG. 5 illustrates an example of sample-based Simplified Depth Coding (SDC) for Horizontal mode.

FIG. 6 illustrates an example of sample-based Simplified Depth Coding (SDC) for the Vertical mode.

FIG. 7 illustrates an exemplary reconstruction process in the decoder side for sample-based Simplified Depth Coding (SDC) using the Horizontal mode according to an embodiment of the present invention.

DETAILED DESCRIPTION OF THE INVENTION

In order to improve the coding efficiency of SDC coding, embodiments according to the present invention uses extended prediction modes for SDC coding, where the extended prediction modes includes Horizontal Intra mode, Vertical Intra mode or both in additional to the conventional Planar mode and DMM Mode 1. The Intra prediction mode for SDC is also referred as Intra prediction type in this disclosure. The Horizontal Intra mode and the Vertical Intra mode are also referred as Horizontal mode and Vertical mode in this disclosure. For example, the set of extended Intra prediction types, of segmentation/prediction for the current block may correspond to:
  a. DMM Mode 1—Explicit Wedgelets (2 segments)
  b. Planar (1 segment)
  c. Horizontal (1 segment)
  d. Vertical (1 segment)

For the DMM mode, additional prediction information is coded to indicate the partition. For each resulting segment, a residual value (in the pixel domain) is signalled in the bitstream. The two additional types or modes, i.e., Horizontal and Vertical Intra prediction process is described as follows
  Horizontal Mode:
    Generate the predictors of the Horizontal Intra mode as shown in FIG. 5, where the reconstructed neighboring depth column (510) adjacent to the current left block boundary of the current block (520) is used to generate the prediction samples. Each sample in the neighboring column is used to generate the prediction samples for a corresponding row of the current block.
    The DC prediction value (i.e., a single predicting depth value ($d_{pred}$) for the block) is the mean of the predictors or the mean of the subset of the predictors of the Horizontal mode as shown in FIG. 5.
  Vertical Mode:
    Generate the predictors of the Vertical Intra mode as shown in FIG. 6, where the reconstructed neighboring depth row (610) adjacent to the current top block boundary of the current block (620) is used to generate the prediction samples. Each sample in the neighboring row is used to generate the prediction samples for a corresponding column of the current block.
    The DC prediction value (i.e., a single predicting depth value ($d_{pred}$) for the block) is the mean of the predictors or the mean of the subset of the predictors of the Vertical mode as shown in FIG. 6.

Figure 1:
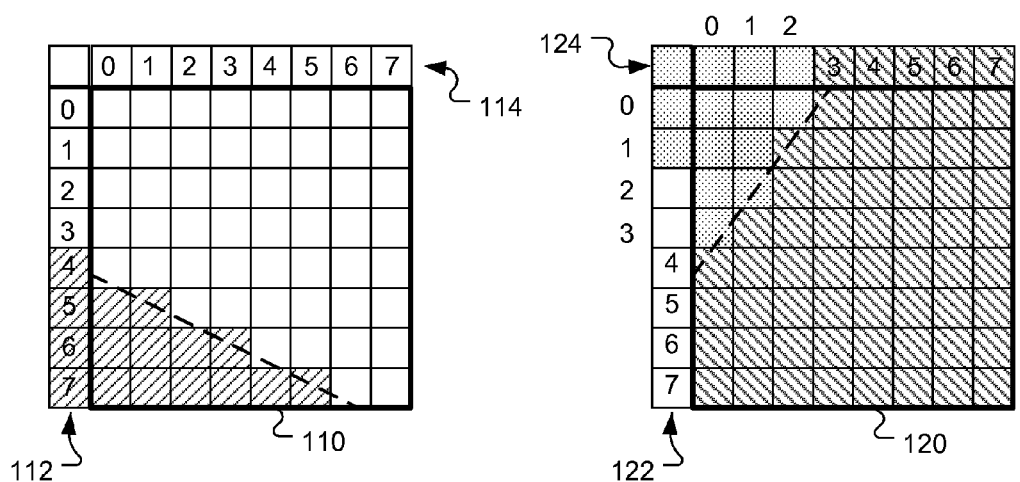
FIG. 1 illustrates two examples of Depth Modelling Mode (DMM) for depth coding based on Simplified Depth Coding (SDC), where the depth block is divided into two segments and each segment is modelled as a uniform area.
Figure 2A:
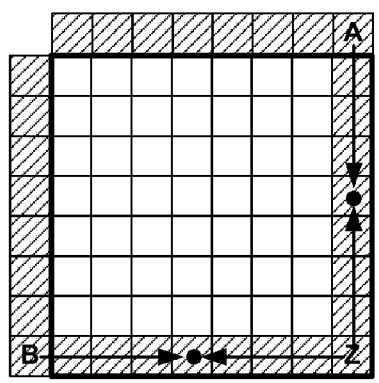
FIG. 2A and FIG. 2B illustrate the linear interpolation and bilinear interpolation used to generate prediction samples for the depth block based on reconstructed neighboring depth samples according to the Planar mode in SDC.
Figure 2B:
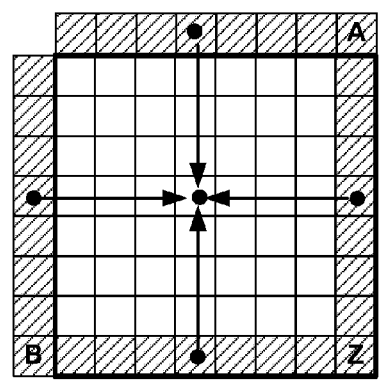
Figure 3:
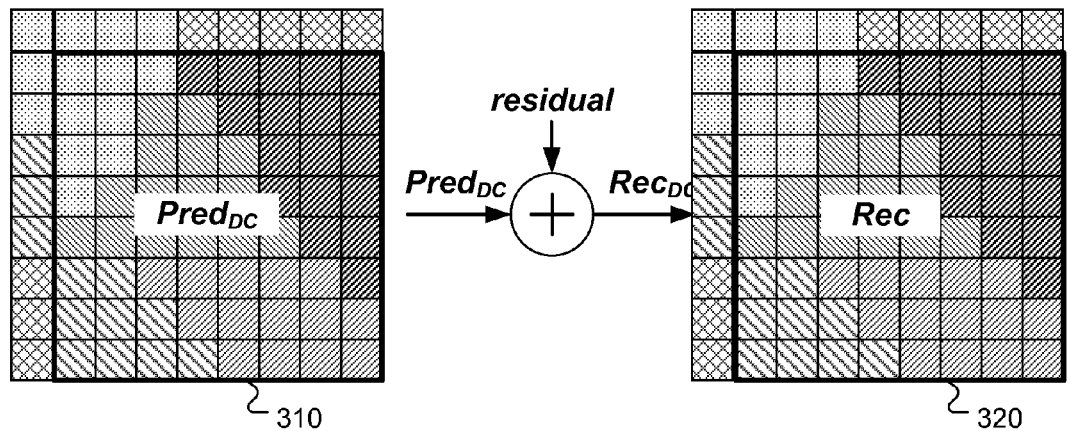
FIG. 3 illustrates an exemplary reconstruction process for Simplified Depth Coding (SDC) using the Planar mode.
Figure 4:
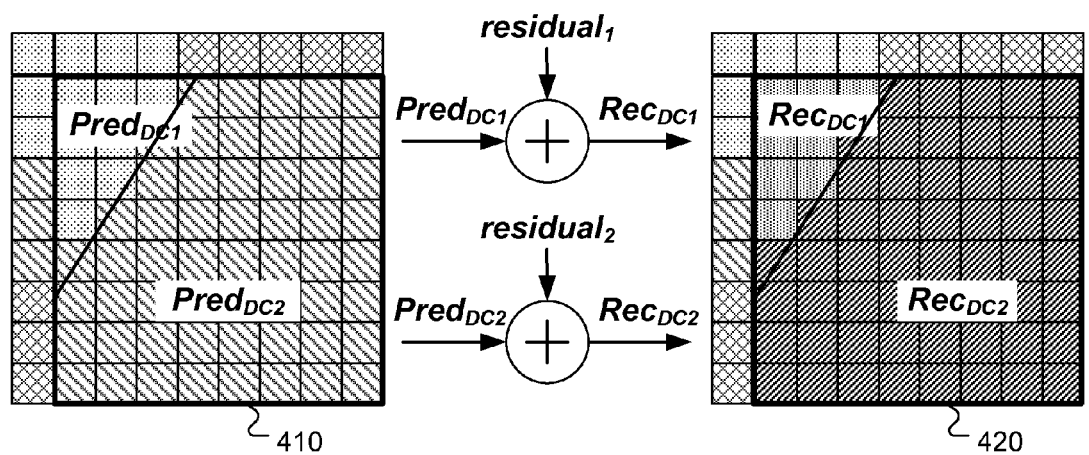
FIG. 4 illustrates an exemplary reconstruction process for Simplified Depth Coding (SDC) using the Depth Modelling Mode (DMM) Mode 1.
Figure 8:
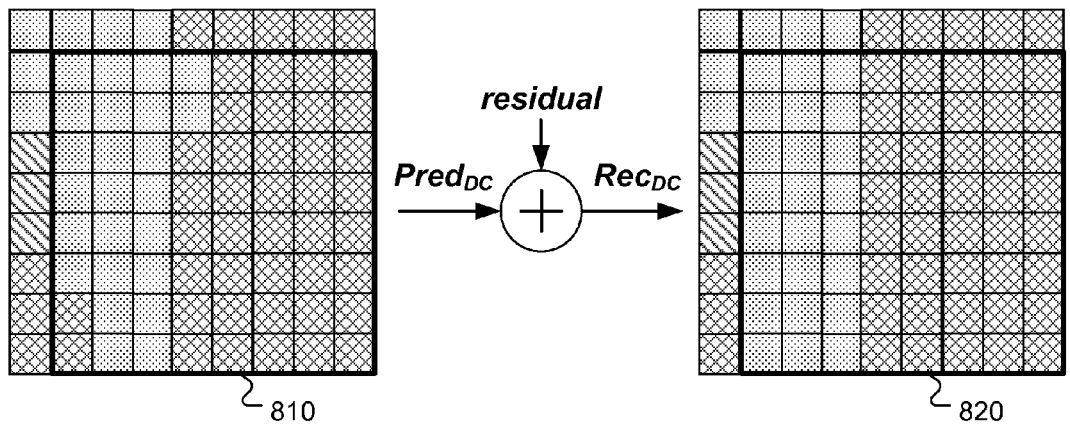
FIG. 8 illustrates an exemplary reconstruction process in the decoder side for sample-based Simplified Depth Coding (SDC) using the Vertical mode according to an embodiment of the present invention.

An example of the reconstruction process for the Horizontal mode and the Vertical mode at the decoder side is illustrated in FIG. 7 and FIG. 8 respectively. In FIG. 7, block 710 corresponds to the predicted depth values and block 720 corresponds to the reconstructed block using the Horizontal mode. The DC prediction value (i.e., predicting depth value), $Pred_{DC}$ is derived for the current block 710. The $Pred_{DC}$ is added to the residual received to form the reconstructed residual value for the block, $Rec_{DC}$. This reconstructed residual value is then updated by the individual prediction samples derived according to Horizontal mode to form reconstructed depth samples for the block 720. In FIG. 8, block 810 corresponds to the predicted depth values and block 820 corresponds to the reconstructed block using the Vertical mode. The process to reconstruct DC prediction value for the block, $Rec_{DC}$ is similar to the case for the Horizontal mode. The reconstructed depth value for the block 820 is derived from $$d_{rec} = I^{-1}(i_{resi} + I(d_{pred})), \qquad (2)$$

with $I^{-1}(.)$ denoting the inverse Index Lookup table. At the decoder side, the reconstructed residual $R_{rec}$ is derived by $$R_{rec} = d_{rec} - d_{pred}. \qquad (3)$$

Each prediction sample of the current block or prediction unit (PU) is then updated with the reconstructed residual, i.e., the reconstructed residual is added to each prediction sample as the new prediction sample. Accordingly, the prediction samples of Horizontal\Vertical mode will be the prediction samples of the Horizontal\Vertical mode plus an offset value, where the offset value is derived from the residual index.

In another example, all the prediction samples of the current block or PU will be replaced by a same reconstructed depth value derived from $$d_{rec} = I^{-1}(i_{resi} + I(d_{pred})),$$

with $I^{-1}(.)$ denoting the inverse Index Lookup table.

In the above example, the set of extended Intra prediction types of segmentation/prediction corresponds to {DMM Mode 1, Planar mode, Horizontal mode, Vertical mode}. However, other sets of extended Intra prediction types may also be used to practice the present invention. For example, the set of extended Intra prediction types may correspond to:
  {DC mode, DMM Mode 1, Horizontal mode, Vertical mode}
  {Planar mode, DMM Mode 1, Horizontal mode, Vertical mode}
  {Planar mode, DC Mode, Horizontal mode, Vertical mode}
  {DMM mode 1, Planar mode, Horizontal mode, Vertical mode, Diagonal Mode 2, Diagonal Mode 8}
where Diagonal Mode 2 and Diagonal Mode 8 are the Intra prediction modes for texture video data as described in the HEVC standard (H.265: High efficiency video coding, Recommendation ITU-T H.265. April 2013).

The order of the type for generating prediction samples may also be changed. Based on this order, a truncated unary code can be used to signal the type selected for the current block. An example of the modified coding table with these two additional modes, i.e., Horizontal and Vertical modes are shown in Table 1.

TABLE 1

| DepthIntraMode | Associated name | depthIntraModeSet | | | |
|---|---|---|---|---|---|
| | | 0 | 1 | 2 | 3 |
| | | depthIntraModeMaxLen | | | |
| | | 1 | 3 | 3 | 2 |
| | | depth_intra_mode | | | |
| 0 | INTRA_DEP_SDC_PLANAR | 0 | — | 0 | — |
| 1 | INTRA_DEP_NONE | 1 | 0 | — | 0 |
| 2 | INTRA_DEP_SDC_DMM_WFULL | — | — | — | 1 |
| 3 | INTRA_DEP_DMM_WFULL | — | 1 | 3 | — |
| 4 | INTRA_DEP_DMM_CPREDTEX | — | — | — | 2 |
| 5 | INTRA_DEP_DMM_WPREDTEX | — | 2 | 2 | — |
| 6 | INTRA_DEP_CHAIN | — | 3 | 1 | — |
| 7 | INTRA_DEP_SDC_HOR | 2 | — | — | 3 |
| 8 | INTRA_DEP_SDC_VER | 3 | — | — | 4 |

An example of the binarization for depth Intra mode with additional Horizontal and Vertical modes is shown in Table 2.

TABLE 2

| | Bin String | | | |
|---|---|---|---|---|
| | (cLog2CbSize == 3 && PartMode[xC][yC] == PART_2Nx2N) \|\| (cLog2CbSize > 3 && cLog2CbSize < 6) | | cLog2CbSize == 3 && PartMode [xC][yC] == PART_NxN | cLog2Cb Size == 6 |
| Name of depth_intra_mode | !depth_intra_mode_offset_flag | depth_intra_mode_offset_flag | | |
| INTRA_DEP_SDC_PLANAR | | 0 | — | 0 |
| INTRA_DEP_CHAIN | | 10 | 111 | — |
| INTRA_DEP_DMM_WPREDTEX | | 110 | 110 | — |
| INTRA_DEP_DMM_WFULL | | 111 | 10 | — |
| INTRA_DEP_NONE | 0 | | 0 | 10 |
| INTRA_DEP_SDC_DMM_WFULL | 10 | | — | — |
| INTRA_DEP_DMM_CPREDTEX | 110 | | — | — |
| INTRA_DEP_SDC_HORIZONTAL | 1110 | | — | 110 |
| INTRA_DEP_SDC_VERTICAL | 1111 | | — | 111 |

For the set of extended Intra prediction types for SDC coding according to embodiments of the present invention, the predicting depth value ($d_{pred}$) in those Intra prediction modes can be calculated from all prediction samples, or the prediction samples after sub-sampling, or a subset of the prediction samples. Since the prediction samples are derived based on reconstructed neighboring depth samples, the predicting depth value ($d_{pred}$) may also be derived directly using the reconstructed neighboring depth samples of the current coding block. The function used to derive the predicting depth value can be the mean, median, maximum, minimum, or a linear combination of the prediction samples, the prediction samples after sub-sampling, the subset of the prediction samples, or the neighboring reconstructed samples of the current coding block.

When a subset of the prediction samples is used to derive the predicting depth value ($d_{pred}$) for the Intra prediction modes, any of the following subsets can be used:
 The first row and first column of current coding block,
 The center prediction sample of current coding block,
 The four corner samples of current coding block,
 The two corner samples of the first/last/one row of current coding block, and
 The two corner samples of the left-most/right-most/one column of current coding block.

Figure 9:
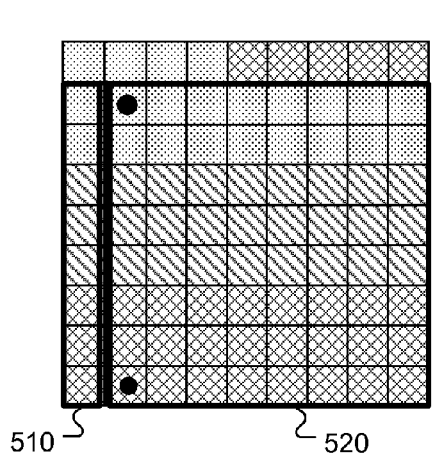
FIG. 9 illustrates an example of using different subsets of prediction samples for calculating predicting depth value in the Horizontal Intra modes for SDC.
Figure 10:
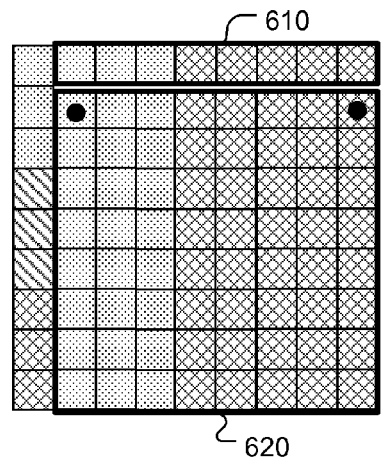
FIG. 10 illustrates an example of using different subsets of prediction samples for calculating predicting depth values in the Vertical Intra modes for SDC.

In another example, different subsets of the prediction samples can be used for difference Intra prediction modes for SDC. For example, for the Horizontal Intra mode, the two corner samples (shown as two black dots) of the left-most column can be used to calculate the predicting depth value as shown in FIG. 9. Alternatively, any other column such as the right-most column may also be used for Horizontal Intra mode to derive the predicting depth value ($d_{pred}$). As for the Vertical Intra mode, the two corner samples (shown as two black dots) of the first row can be used to calculate the predicting depth value as shown in FIG. 10. Alternatively, any other row such as the last row can also be used to determine for the Vertical Intra mode to derive the predicting depth value ($d_{pred}$).

Figure 11:
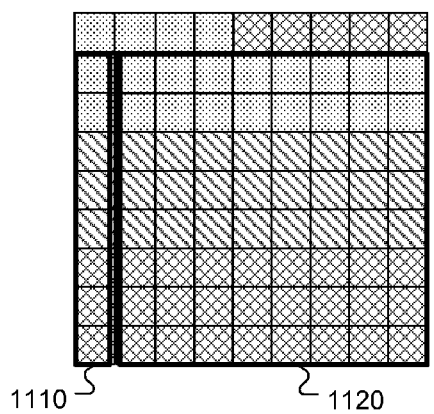
FIG. 11 illustrates an example of using all samples, a single sample, partial samples, or two corner samples of a reconstructed neighboring depth column to calculate predicting depth values in the Horizontal Intra mode.
Figure 12:
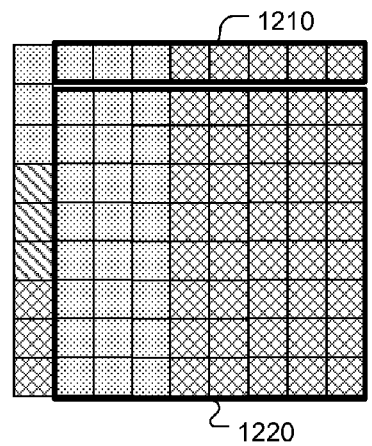
FIG. 12 illustrates an example of using all samples, a single sample, partial samples, or two corner samples of a reconstructed neighboring depth row to calculate predicting depth values in the Vertical Intra mode.

In another embodiment of the present invention, the neighboring reconstructed samples are used to derive the predicting depth value. For example, for the Horizontal Intra mode, all samples, a single sample, partial samples, or two corner samples of the reconstructed neighboring depth column (1110) adjacent to the left block boundary of the current block 1120 can be used to calculate the predicting depth value as shown in FIG. 11. As for the Vertical Intra mode, all samples, a single sample, partial samples, or two corner samples of the reconstructed neighboring depth row (1210) adjacent to the top block boundary of the current block (1220) can be used to derive the predicting depth value as shown in FIG. 12.

The performance of a 3D video coding system incorporating an extended Intra prediction mode set according to an embodiment of the present invention is compared to that of a conventional system based on HTM-8.0 (High Efficiency Video Coding based 3D Coding Test Model, version 8.0). The types of Intra prediction for the HTM-8.0 include DMM Mode 1 and Planar mode. The embodiment according to the present invention further includes Horizontal mode and Vertical mode. The performance comparison is based on different sets of test data listed in the first column. The test results of the system incorporating an embodiment of the present invention under the common test conditions (CTC) and under the all-Intra (AI) test conditions are shown in Table 3 and Table 4, respectively. As shown in the tables, the system with extended Intra prediction mode set according to the present invention can achieve over 0.1% BD-rate saving in some cases. The average decoding time can be reduced by more than 3%.

step 1350, the prediction samples are derived based on a reconstructed neighboring depth column adjacent to a left block boundary of the current depth block by generating rows of the prediction samples from the reconstructed neighboring depth column. In step 1340, the process further tests "Mode=Vertical?". If the result is "Yes", the process goes to step 1360. If the result is "No", the process goes to step 1370. In step 1360, the prediction samples are derived based on a reconstructed neighboring depth row adjacent to a top block boundary of the current depth block by generating columns of the prediction samples from the reconstructed neighboring depth. In step 1370, the prediction samples are derived for other modes. After the prediction samples are derived, Simplified Depth Coding (SDC) is

TABLE 3

| | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| Balloons | 0.00% | −0.16% | −0.04% | −0.06% | −0.09% | −0.05% | 101.4% | 98.8% | 99.8% |
| Kendo | 0.00% | 0.14% | −0.18% | 0.00% | −0.08% | −0.10% | 100.1% | 96.7% | 100.2% |
| Newspapercc | 0.00% | 0.04% | 0.05% | 0.01% | −0.04% | 0.04% | 100.7% | 93.9% | 98.9% |
| GhostTownFly | 0.00% | 0.16% | −0.03% | 0.02% | −0.15% | −0.19% | 101.6% | 93.3% | 98.6% |
| PoznanHall2 | 0.00% | 0.22% | −0.19% | 0.00% | −0.03% | −0.16% | 99.5% | 97.9% | 100.4% |
| PoznanStreet | 0.00% | 0.15% | 0.13% | 0.05% | −0.02% | −0.10% | 100.4% | 98.2% | 100.5% |
| UndoDancer | 0.00% | −0.02% | −0.26% | −0.04% | −0.07% | −0.20% | 100.4% | 95.8% | 96.1% |
| 1024 × 768 | 0.00% | 0.01% | −0.06% | −0.02% | −0.07% | −0.04% | 100.8% | 96.5% | 99.6% |
| 1920 × 1088 | 0.00% | 0.13% | −0.09% | 0.01% | −0.07% | −0.16% | 100.5% | 96.3% | 98.9% |
| average | 0.00% | 0.07% | −0.08% | 0.00% | −0.07% | −0.11% | 100.6% | 96.4% | 99.2% |

TABLE 4

| | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| Balloons | 0.00% | 0.00% | 0.00% | 0.00% | −0.01% | −0.04% | 100.3% | 94.4% | 99.4% |
| Kendo | 0.00% | 0.00% | 0.00% | 0.00% | −0.02% | −0.02% | 100.6% | 99.1% | 102.9% |
| Newspapercc | 0.00% | 0.00% | 0.00% | 0.00% | −0.02% | −0.05% | 100.9% | 101.2% | 102.5% |
| GhostTownFly | 0.00% | 0.00% | 0.00% | 0.00% | −0.35% | −0.32% | 101.9% | 90.4% | 101.3% |
| PoznanHall2 | 0.00% | 0.00% | 0.00% | 0.00% | −0.12% | −0.17% | 101.8% | 97.8% | 98.8% |
| PoznanStreet | 0.00% | 0.00% | 0.00% | 0.00% | −0.15% | −0.17% | 101.7% | 99.0% | 94.6% |
| UndoDancer | 0.00% | 0.00% | 0.00% | 0.00% | −0.07% | −0.10% | 101.8% | 94.8% | 100.6% |
| 1024 × 768 | 0.00% | 0.00% | 0.00% | 0.00% | −0.02% | −0.04% | 100.6% | 98.2% | 101.6% |
| 1920 × 1088 | 0.00% | 0.00% | 0.00% | 0.00% | −0.17% | −0.19% | 101.8% | 95.5% | 98.8% |
| average | 0.00% | 0.00% | 0.00% | 0.00% | −0.11% | −0.13% | 101.3% | 96.7% | 100.0% |

Figure 13:
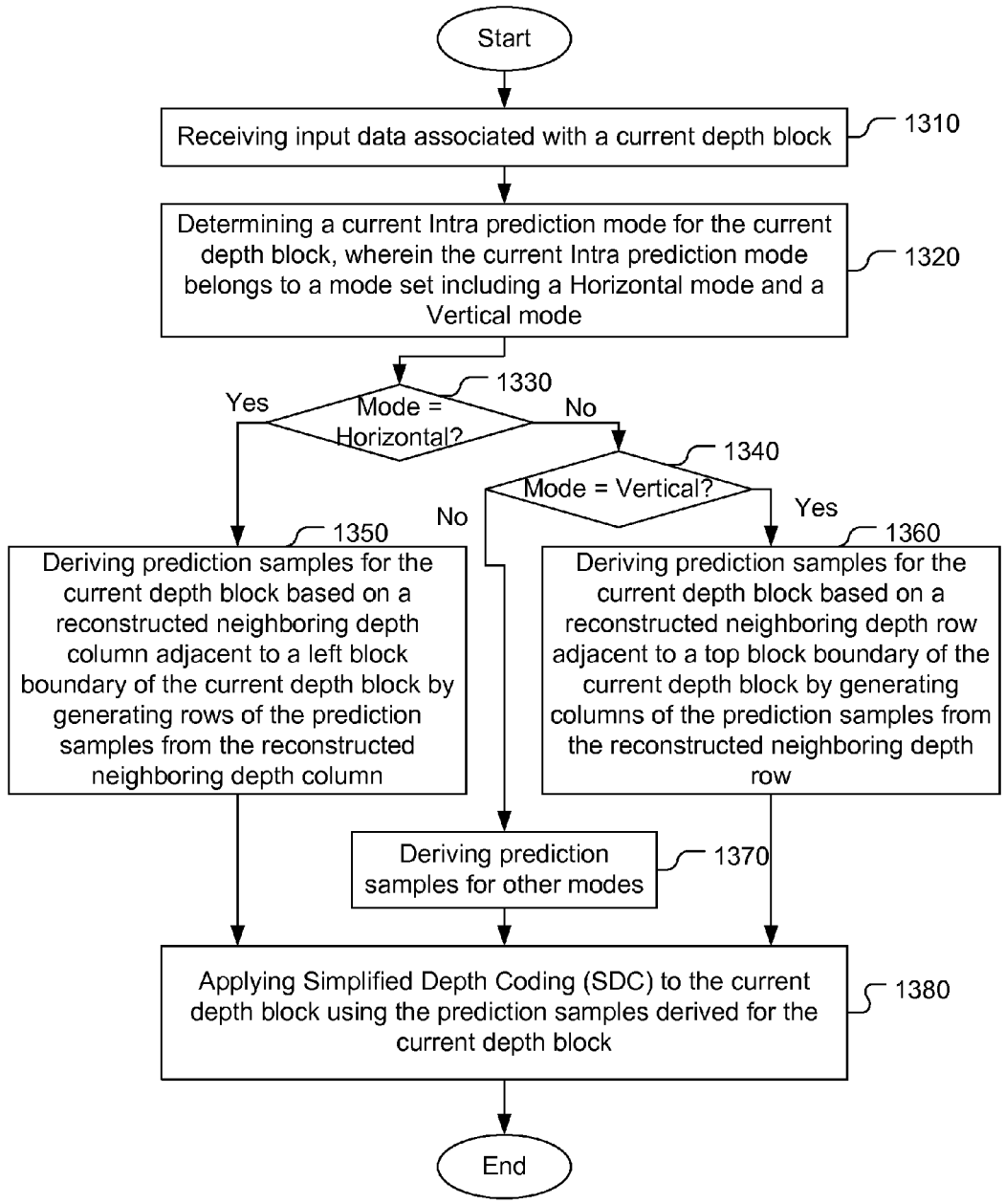
FIG. 13 illustrates an exemplary flowchart of Simplified Depth Coding (SDC) for depth data using extended Intra prediction mode set according to an embodiment of the present invention.

FIG. 13 illustrates an exemplary flowchart of Simplified Depth Coding (SDC) for depth data using extended Intra prediction mode set according to an embodiment of the present invention. The system receives input data associated with a current depth block as shown in step 1310. For encoding, the input data associated with the depth block corresponds to the depth samples to be coded. For decoding, the input data associated with the current depth block corresponds to the coded depth data to be decoded. The input data associated with the current depth block may be retrieved from memory (e.g., computer memory, buffer (RAM or DRAM) or other media) or from a processor. A current Intra prediction mode for the current depth block is determined in step 1320, where the current Intra prediction mode belongs to a mode set comprising a Horizontal mode and a Vertical mode. A test "Mode=Horizontal?" is perform in step 1330. If the result is "Yes", the process goes to step 1350. If the result is "No", the process goes to step 1340. In applied to the current depth block using the prediction samples derived for the current depth block as shown in step 1380.

The flowchart shown above is intended to illustrate an example of Simplified Depth Coding (SDC) with an extended Intra prediction mode set. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of Intra coding for a depth block in a three-dimensional coding system, the method comprising:
   receiving input data associated with a current depth block;
   determining a current Intra prediction mode for the current depth block, wherein the current Intra prediction mode belongs to a mode set comprising Horizontal mode and Vertical mode;
   deriving prediction samples for the current depth block based on reconstructed neighboring depth samples according to the current Intra prediction mode, wherein said deriving prediction samples uses a reconstructed neighboring depth column adjacent to a left block boundary of the current depth block to perform horizontal prediction by generating rows of the prediction samples from the reconstructed neighboring depth column if the Horizontal mode is selected, and wherein said deriving prediction samples uses a reconstructed neighboring depth row adjacent to a top block boundary of the current depth block to perform vertical prediction by generating columns of the prediction samples from the reconstructed neighboring depth row if the Vertical mode is selected; and
   applying Simplified Depth Coding (SDC) to the current depth block using the prediction samples derived for the current depth block.

2. The method of claim 1, wherein the mode set further comprises Planar mode and DMM (Depth Modelling Mode) mode.

3. The method of claim 1, wherein the Intra prediction modes in the mode set are coded using a truncated unary code.

4. The method of claim 1, wherein a predicting depth value representing a single prediction value for the current depth block is determined based on two corner prediction samples of a left-most column of the current depth block if the Horizontal mode is selected.

5. The method of claim 1, wherein a predicting depth value representing a single prediction value for the current depth block is determined based on all reconstructed samples, one reconstructed samples, partial reconstructed samples, or two corner reconstructed samples of the reconstructed neighboring depth column adjacent to the left block boundary of the current depth block if the Horizontal mode is selected.

6. The method of claim 1, wherein a predicting depth value representing a single prediction value for the current depth block is determined based on two corner prediction samples of a top row of the current depth block if the Vertical mode is selected.

7. The method of claim 1, wherein a predicting depth value representing a single prediction value for the current depth block is determined based on all reconstructed samples, one reconstructed samples, partial reconstructed samples, or two corner reconstructed samples of the reconstructed neighboring depth row adjacent to the top block boundary of the current depth block if the Vertical mode is selected.

8. The method of claim 1, wherein a predicting depth value representing a single prediction value for the current depth block is determined based on four corner prediction samples of the current depth block.

9. The method of claim 1, wherein a predicting depth value representing a single prediction value for the current depth block is determined based on all prediction samples, sub-sampled prediction samples, or a subset of the prediction samples of the current depth block.

10. The method of claim 9, wherein the predicting depth value is determined using a mean, median, maximum, minimum, or linear combination of said all prediction samples, the sub-sampled prediction samples, or the subset of the prediction samples of the current depth block.

11. The method of claim 9, wherein the predicting depth value is determined using a mean of four corner prediction samples of the current depth block.

12. The method of claim 1, wherein a predicting depth value representing a single prediction value for the current depth block if the Horizontal mode is selected and the single prediction value is determined based on a first subset of the prediction samples, wherein a second subset of the prediction samples different from the first subset is used to determine one or more single prediction values for the current depth block if a different mode is used, and wherein the first subset corresponds to one prediction sample, two corner prediction samples or all prediction samples located in a selected column of the current depth block.

13. The method of claim 12, wherein the selected column corresponds to a left-most column of the current depth block.

14. The method of claim 1, wherein a predicting depth value representing a single prediction value for the current depth block if the Vertical mode is selected and the single prediction value is determined based on a first subset of the prediction samples, wherein a second subset of the prediction samples different from the first subset is used to determine one or more single prediction values for the current depth block if a different mode is used, and wherein the first subset corresponds to one prediction sample, two corner prediction samples or all prediction samples located in a selected row of the current depth block.

15. The method of claim 14, wherein the select row corresponds to a top row of the current depth block.

16. An apparatus for Intra coding of a depth block in a three-dimensional coding system, the apparatus comprising one or more electronic circuits configured to:

receive input data associated with a current depth block;

determine a current Intra prediction mode for the current depth block, wherein the current Intra prediction mode belongs to a mode set comprising Horizontal mode and Vertical mode;

derive prediction samples for the current depth block based on reconstructed neighboring depth samples according to the current Intra prediction mode, wherein if the Horizontal mode is selected, said one or more electronic circuits are configured to derive prediction samples using a reconstructed neighboring depth column adjacent to a left block boundary of the current depth block by generating rows of the prediction samples from the reconstructed neighboring depth column, and wherein if the Vertical mode is selected, said one or more electronic circuits are configured to derive prediction samples using a reconstructed neighboring depth row adjacent to a top block boundary of the current depth block by generating columns of the prediction samples from the reconstructed neighboring depth row; and apply Simplified Depth Coding (SDC) to the current depth block using the prediction samples derived for the current depth block.

* * * * *